Feb. 21, 1961 F. Y. CARTER 2,972,237
REFRIGERANT EXPANSION VALVE AND CONTROL UNIT THEREFOR
Filed July 2, 1958
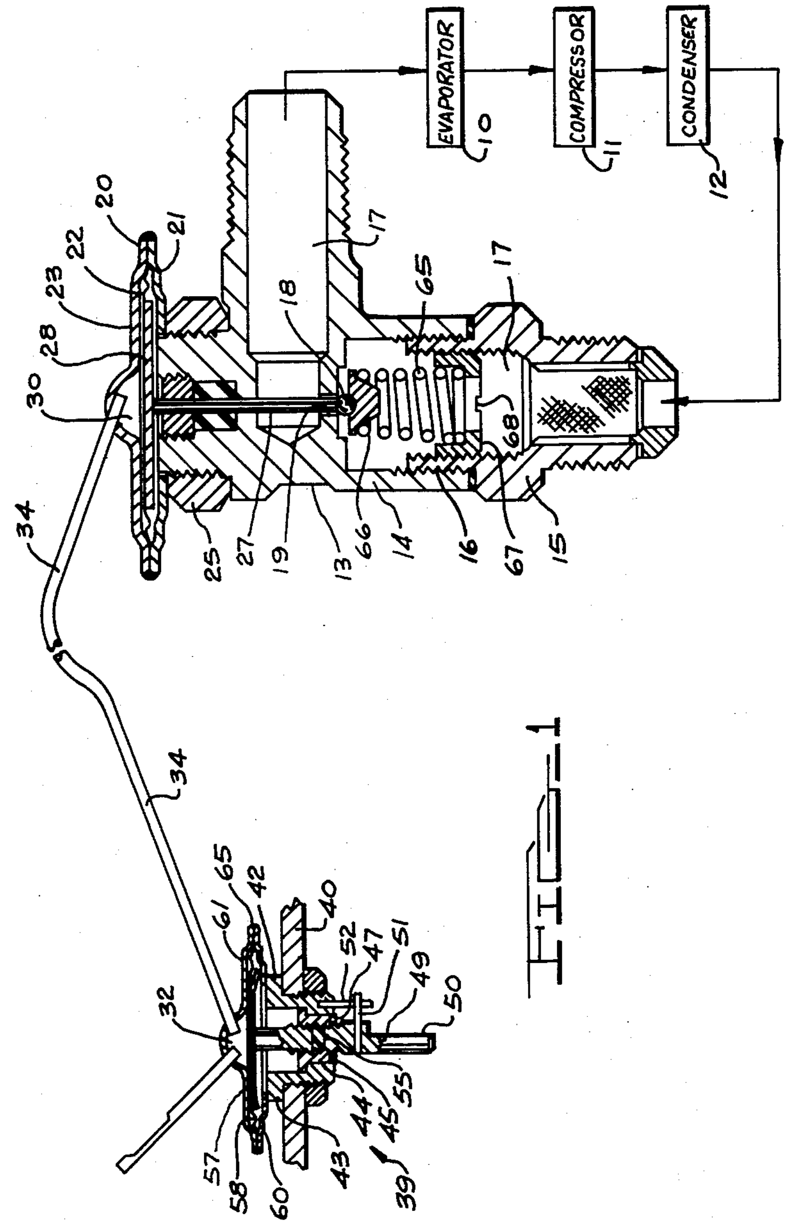
INVENTOR.
FRANKLYN Y. CARTER
BY
SMITH, WILSON, LEWIS & McRAE

United States Patent Office 2,972,237

Patented Feb. 21, 1961

1

2,972,237

REFRIGERANT EXPANSION VALVE AND CONTROL UNIT THEREFOR

Franklyn Young Carter, Dearborn, Mich., assignor to American Radiator & Standard Sanitary Corporation, New York, N.Y., a corporation of Delaware Filed July 2, 1958, Ser. No. 746,124

1 Claim. (Cl. 62—211)

This invention relates to a flow control valve, as for example a refrigerant expansion valve for use in automobile air conditioning systems or other refrigerant systems wherein it is desired to have a controlled flow through the valve.

One object of the present invention is to provide a flow control valve having a flow-throttling element which is accurately regulated for controlling the flow by means of remote manually operative mechanism, thereby enabling the valve mechanism to be located at any desired point relative to the point of manual control.

Another object of the present invention is to provide a manually operative controller for a flow control valve, wherein the controller is of simplified low cost construction.

Another object of the present invention is to provide a manually operable controller for a flow control valve, wherein the manually operable controller is easily adjusted to any desired position but once in its adjusted position is retained therein without tendency to work loose by reason of vibrations or other position-disturbing forces which may be encountered during operation of an automotive vehicle.

Another object of the invention is to provide a flow control valve and remotely situated manual operator, wherein the flow control valve and manual operator are of small size design so as to adapt the devices for use in small spaces.

Other objects of this invention will appear in the following description and appended claim, reference being had to the accompanying drawings forming a part of this specification wherein like reference characters designate corresponding parts in the several views.

In the drawings:

Fig. 1 is a view of a refrigerant system having an expansion valve and manual control unit of the present invention incorporated therein, said valve and control unit being shown in section to illustrate their interior mechanisms.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a refrigeration system which incorporates an evaporator 10, compressor 11, condenser 12, and refrigerant expansion valve 13. The expansion valve 13 comprises a two-piece valve body including valve body member 14 and valve body member 15 threadingly interconnected together at 16. As shown in the drawings the valve body formed by members 14 and 15 is internally contoured to define a flow passage 17. Fluid flow through the passage is controlled by a flow-throttling ball 18 positionable against the valve

2 seat formed by orifice 19, said orifice constituting a portion of the flow passage 17.

In order to regulate the position of ball element 18 so as to control fluid flow there is provided a pressure unit 20 defined by a housing member 21, a corrugated metal diaphragm 22 and a second housing member 23. The two housing members and interposed diaphragm are clamped against opposite peripheral edge portions of diaphragm 22, and the diaphragm-housing assembly is welded at its peripheral edges to form the complete pressure unit. The pressure unit is welded or otherwise fixedly secured to a nut 25 which is threaded onto the upper portion of valve body member 14.

In order to transmit movement of diaphragm 22 into flow-controlling movement of ball 18 there are provided one or more thrust rods 27 which extend upwardly from pressure engagement with ball 18 into contact with a pressure plate 28 carried on the under face of diaphragm 22.

The space above diaphragm 22 defines a pressure chamber 30 which is in fluid communication with a second pressure chamber 32 by means of a capillary conduit 34. Pressure chamber 32 is defined by a housing structure forming part of a manual control unit 39 positioned on a supporting panel 40 located behind the dashboard of an automotive vehicle (not shown).

Manual control unit 39 comprises a support structure 42 defined by an externally threaded support element 43 and internally threaded support element 44 rotatably seated within element 43 prior to adjustment of the unit at the factory. After factory calibration of the unit a portion 45 of element 43 is staked into one or more slots 47 formed in the lower end of element 44. During operation of the control unit elements 43 and 44 are securely locked together, there being no relative rotary movement therebetween.

Threadedly extending through support element 44 is a screw 49 having a shank portion 50 adapted to receive a manually-actuable knob (not shown) positioned on the exterior surface of the automotive vehicle dashboard. During operation of the control unit it is desirable to limit the rotary movement of screw 49, and there is accordingly provided a pin 51 which extends from screw 49 across one or more pins 52 projecting from support element 43. In use of the control mechanism screw 49 is limited in its rotatable movement by means of the pins 51 and 52 so as to prevent inadvertent turning out of screw 49 from support element 44.

During operation it is desirable that screw 49 be easily rotated but prevented from inadvertent rotation after adjustment; therefore there is provided a cylindrical rubber plug 55 which extends through a cross bore in screw 49 into frictional engagement with the thread-forming surfaces of element 44 so as to adjustably retain screw 49 in its desired set position. The frictional engagement is sufficient to lock screw 49 in position but is not sufficient to seriously interfere with rotary movement of knob 49 under manual actuation.

Screw 49 extends into engagement with a pressure plate 57 carried on the under surface of a corrugated metal diaphragm 58. The peripheral edge portion of diaphragm 58 is clamped between the opposed peripheral edge portions of housing members 60 and 61, and the diaphragm-housing assembly is secured together by peripheral welding 65. Chamber 32, capillary 34 and chamber 30 are charged with air, other gas, fluid, oil or other liquid so as to form a fluid pressure system for controlling the position of ball 18.

Assembly of unit 39 is effected by initially securing the diaphragm-housing unit 58, 60, 61 onto support element 43 with screw 49 threaded through element 44, but without portions 45 staked into slots 47. Element 44 is then rotated relative to element 43 so as to rectilinearly advance screw 49 to its correct position relative to diaphragm 58. Portions 45 are then staked into slots 47 to hold the unit in a properly calibrated condition.

During operation of the illustrated apparatus manual rotation of screw 49 in a direction to move diaphragm 58 upwardly is effective to reduce the quantity of fluid within chamber 32 so as to force a portion of said fluid into capillary tube 34 and thereby displace a portion of the capillary fluid into pressure chamber 30 in such manner as to increase the pressure on the upper face of diaphragm 22. Thrust rod 27 is thereby moved slightly downward so as to force ball 18 away from the adjacent orifice in such manner as to increase fluid flow through passage 17. The fluid pressure in chamber 30 is opposed by a compression spring 65 which is interposed between ball carrier 66 and abutment member 67. Abutment member 67 is provided with a screw driver slot 68 for allowing axial adjustment of the abutment member so as to control the force developed by spring 65 and thereby regulate the superheat setting of the valve at the factory prior to installation into the refrigeration system.

From the above description of the apparatus and its function, it will be appreciated that there has been disclosed a device having the advantages and objects previously set forth.

Having described the invention, I claim:

In a refrigerating system having a condenser and an evaporator, an expansion valve having a flow passage therethrough for receiving refrigerant from the condenser and discharging it to the evaporator; a flow-throttling element in the valve controlling flow of refrigerant through said passage; a closed fluid pressure transmitting system including a structure defining a first variable volume pressure chamber on the valve, a second variable volume pressure chamber remote from the first pressure chamber, and a conduit interconnecting the two pressure chambers; a non-volatile fluid filling the two pressure chambers and conduit; manually adjustable thrust means operable to vary the pressure within the second pressure chamber for inducing a flow of fluid through said conduit to thereby vary the pressure within the first pressure chamber; a thrust connection between a wall of the first pressure chamber and flow throttling element; a first annular support element for locating the second pressure chamber; and a second internally threaded annular support element rotatably adjustable within the first annular element; the aforementioned thrust connection comprising a screw meshed with the support element threads and a resilient plug extending transversely within the screw in frictional engagement with the support element threads to exert a force against screw rotation.

References Cited in the file of this patent

UNITED STATES PATENTS

| | | |
|---|---|---|
| 874,106 | McCarroll | Dec. 17, 1907 |
| 1,234,949 | Stack | July 31, 1917 |
| 1,555,592 | Lawler | Sept. 29, 1925 |
| 1,829,020 | Shield | Oct. 27, 1931 |
| 2,475,556 | Seligman | July 5, 1949 |
| 2,538,436 | Weinberg | Jan. 16, 1951 |

FOREIGN PATENTS

| | | |
|---|---|---|
| 972 | Great Britain | Apr. 5, 1865 |